United States Patent [19]

Robertson, Jr. et al.

[11] Patent Number: 5,193,890

[45] Date of Patent: Mar. 16, 1993

[54] ELECTRONIC DEVICE MOUNTING TRAY AND RADIO ASSEMBLY

[75] Inventors: William H. Robertson, Jr., Plantation; Donald F. Gatto, Coral Springs, both of Fla.

[73] Assignee: Motorola, Inc., Schaumburg, Ill.

[21] Appl. No.: 869,076

[22] Filed: Apr. 13, 1992

Related U.S. Application Data

[63] Continuation of Ser. No. 691,248, Apr. 25, 1992, abandoned.

[51] Int. Cl.[5] .............................................. A47B 81/06
[52] U.S. Cl. ..................................... 312/7.1; 248/27.1
[58] Field of Search ................ 312/7.1, 245; 248/27.1, 248/553; 455/346, 348, 349, 351

[56] References Cited

U.S. PATENT DOCUMENTS

| | | | |
|---|---|---|---|
| 4,047,776 | 9/1977 | Krick et al. | 312/245 |
| 4,066,307 | 1/1978 | Barding | 248/553 X |
| 4,572,465 | 2/1986 | Rasca | 248/27.1 |
| 4,627,589 | 12/1986 | Hotsumi | 248/553 X |
| 4,714,303 | 12/1987 | Suzuki et al. | 312/7.1 X |
| 4,829,595 | 5/1989 | Kobayashi et al. | 455/351 X |
| 4,947,661 | 8/1990 | Yoshida | 248/27.1 X |
| 4,957,264 | 9/1990 | Hakanen | 312/7.1 X |

OTHER PUBLICATIONS

Motorola Inc., Privacy Plus 500X/1000X Mobile Radio, Installation Instructions, Manual No.: 68P81080E7-6-O, p. 4, dated Mar. 20, 1989.
Motorola Inc., Privacy Plus 500X/1000X 800 MHz Duplex Radio, Maintenance and Troubleshooting Manual No.: 68P81080E74-O, p. 2, dated Mar. 20, 1989.

Primary Examiner—Kenneth J. Dorner
Assistant Examiner—Brian K. Green
Attorney, Agent, or Firm—Pedro P. Hernandez

[57] ABSTRACT

A mounting tray (106) for securing an electronic device includes a planar surface (112) having upstanding side supports (112) and a rear cantilevered member (140). The mounting tray (106) further includes front raised portions (116) having protruding tabs (118) for engaging the electronic device and securing the front of the electronic device. The mounting tray (106) also includes a latching member having at least one aperture (110 and 124) and an upturned latching bracket (108) which are used to engage with the electronic device.

10 Claims, 3 Drawing Sheets

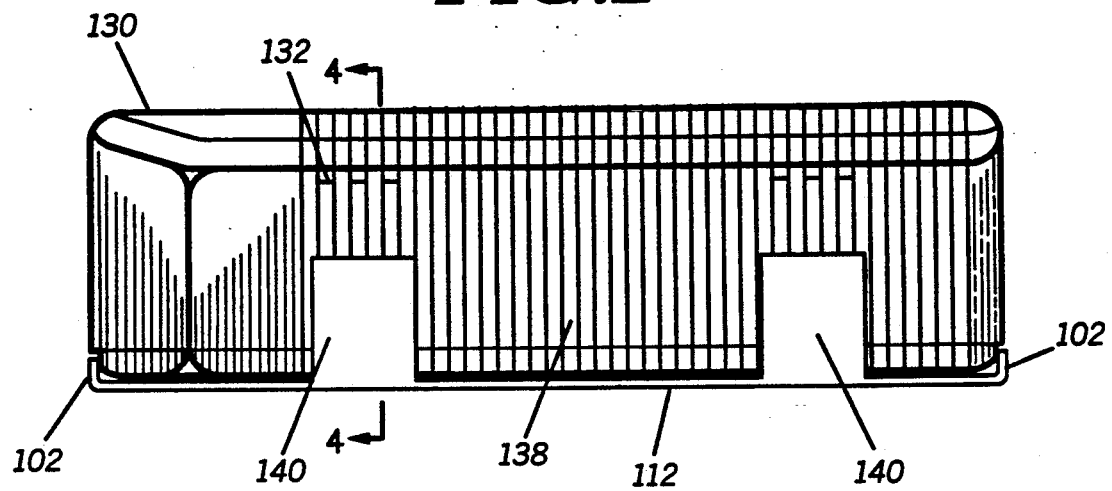
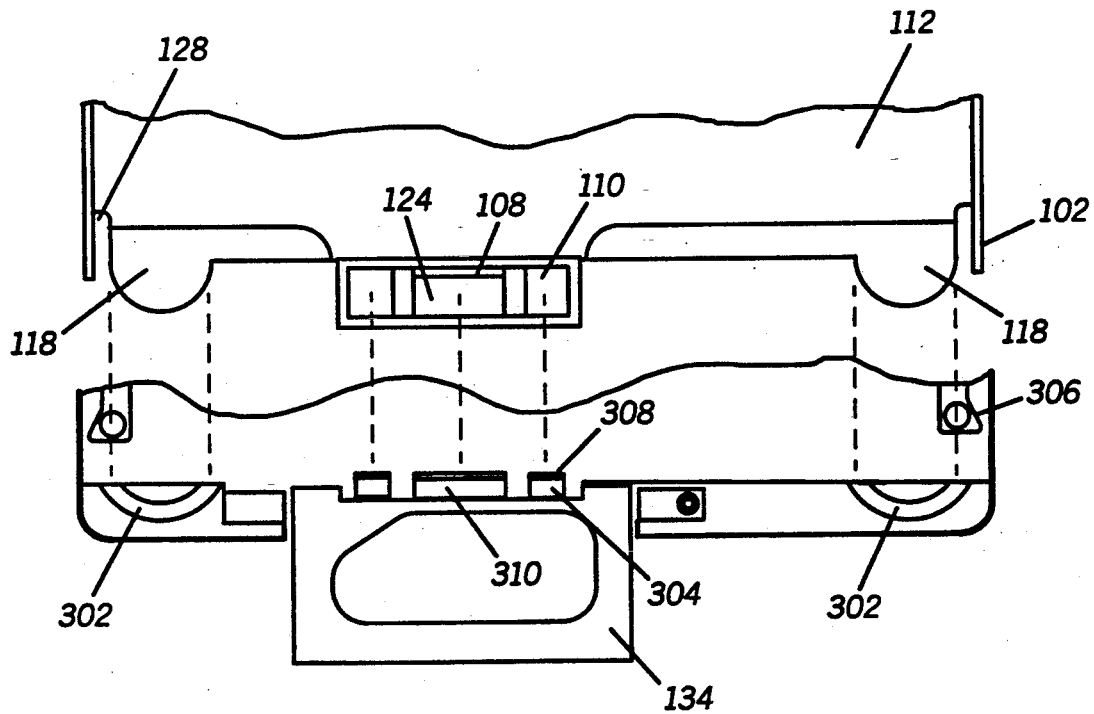

ELECTRONIC DEVICE MOUNTING TRAY AND RADIO ASSEMBLY

This is a continuation of application Ser. No. 07/691,248, filed Apr. 25, 1992, and now abandoned.

TECHNICAL FIELD

This invention relates to mechanical mounting structures, and more specifically to a mounting tray for an electronic device.

BACKGROUND

Mounting trays for electronic devices such as mobile radios are well known in the art. Mounting trays are essentially brackets which are mounted to a vehicle (or other location) for removably receiving a mobile radio or other electronic device. In many applications the tray provides one of the outer walls of the device housing. Mounting trays allow mobile radios, which tend to be large and heavy, to be mounted in motor vehicles such as cars, boats, and other locations where a mobile radio may be required to be mounted. Mounting trays allow mobile radios to be secured in a fixed location in order to protect the radios from moving around especially when mounted to a motor vehicle moving over rough terrain. Prior art mounting trays have unfortunately not been able to secure high power (i.e. heavy) mobile radios in all degrees of freedom in order to prevent vibration, rattle, hum, and noise caused by loose fitting mounting trays. Prolonged vibration and rattle caused by mounting trays which do not securely hold a radio in all three degrees of freedom can cause damage to the sensitive electronic components inside a radio over long periods of time. A need exists for a mounting tray for use with mobile radio communications equipment which can restrain all degrees of freedom in order to avoid the vibration, hum, and noise caused by previous mounting schemes. The mounting tray must also be able to be quickly disconnected from the radio in order to be able to remove the radio whenever the need arises with the minimal of difficulty.

SUMMARY OF THE INVENTION

The mounting tray for securing an electronic device, comprises a substantially planar surface for supporting the electronic device, the substantially planar surface including front, rear and opposed side margins. The mounting tray further including a pair of upstanding side supports located substantially at the side margins and a rear support means including at least one cantilevered member secured to the substantially planar surface substantially at the rear margin. Finally the mounting tray includes a latching means including front raised portions secured to said substantially planar surface at the front margin, the front raised portions having protruding tabs for engaging the electronic device, the latching means further including a latching member having at least one aperture and an upturned latching bracket.

In another aspect of the invention a radio assembly comprises a mounting tray and a radio housing.

BRIEF DESCRIPTION OF THE DRAWINGS

FIG. 2 is a rear view of a radio engaged in a mounting tray in accordance with the present invention.

FIG. 3 is a partial bottom view of the front of the mounting tray and radio in accordance with the present invention.

DETAILED DESCRIPTION OF THE PREFERRED EMBODIMENT

Figure 1:
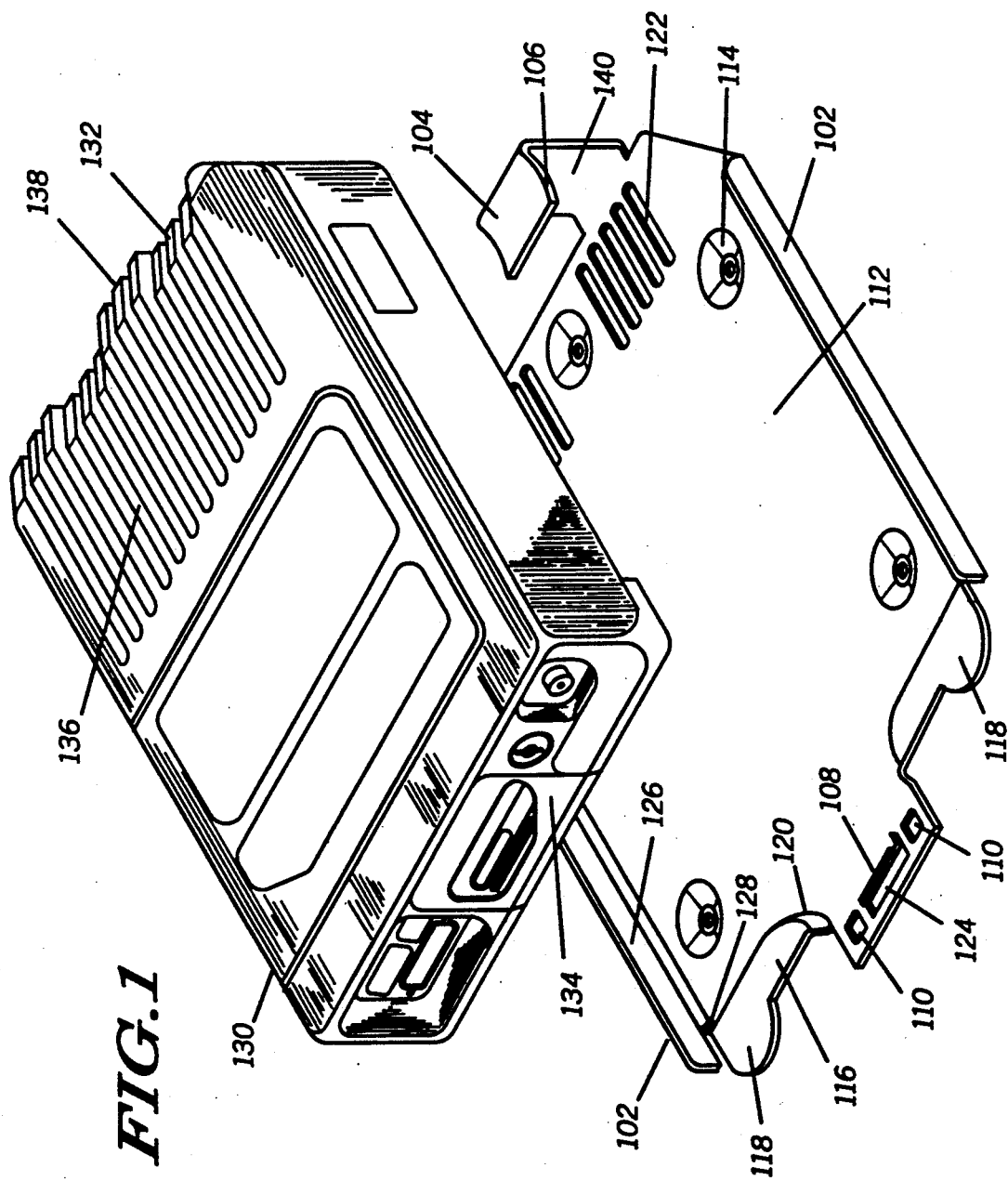
FIG. 1 is a perspective view of a radio and mounting tray in accordance with the present invention.

In FIG. 1 a perspective view of an electronic device such as a mobile radio 130 and mounting tray (or mounting bracket) 106 in accordance with the present invention are shown. The mounting tray 106 comprises a substantially planar surface 112 and includes front, rear, and opposed side margins (or sides). Planar surface 112 preferably includes a plurality of vents 122 and a plurality of recessed fastening locations 114. Vents 122 are used for facilitating the circulation of air to the radio heat sink area 136 in order to dissipate heat generated during normal radio operations. The recessed fastening locations 114 are used primarily to fasten the mounting tray using common fasteners such as screws or bolts. Mounting tray 106 acts as the bottom outer wall (or closure) to the housing of radio 130. A pair of upstanding side supports (or side rails) 102 are located substantially at the side margins of the mounting tray providing lateral support for radio 130. Radio 130 preferably has grooves on the side housing walls in order to accommodate upstanding side supports 102 flush with the outer housing walls of radio 130. The upstanding side supports 102 preferably have a section 128 where they are not connected to planar surface 102, thereby allowing the front margin of the upstanding side supports 102 to be cantilevered and thereby allowing them to offer more resiliency when pushed outwardly by radio 130.

The mounting tray further includes a rear support means that includes at least one cantilevered member 140 secured to the substantially planar surface 112 substantially at the rear margin of the mounting tray. In the preferred embodiment two cantilevered members 140 are utilized due to the size of the radio 130 being secured. The cantilevered member 140 includes an upstanding arm portion and a top support member 104 which is preferably bowed downward. The cantilever member 140 is substantially shaped as an inverted "L". By bowing the top support 104, radio 130 can mechanically load the cantilevered member 140 when the radio is slid into the mounting tray. The cantilevered member 140 has a preferred wall thickness which is preferably the same thickness as the other parts of the mounting tray. Cantilevered member 140 offers resiliency when pressed upwardly by radio 130 against top supports 104. By designing the height of cantilever member 140 to be such as to from a snug fit when radio 130 is placed inside of the mounting tray, the rear of radio 130 can mechanically load the cantilever members 140 thereby controlling any movement by the radio at the rear margin of the mounting tray. Mounting tray 106 further includes a latching means including front raised portions 116 having a raised inner wall 120. The front raised portions 116 have protruding tabs 118 which engage with the electronic device 130. The latching means further includes a latching member located at the front margin of the mounting tray having a set of apertures 110 and 124, and an upturned latching bracket 108.

Preferably, mounting tray 106 is formed from a single sheet of cold rolled steel which can be anodized in order to protect the mounting tray from environmental conditions. The mounting tray can be manufactured from almost any thickness of material, the thickness depending on the size and weight of the radio 130 being supported. In the preferred embodiment, tray 106 is designed from approximately 0.075 inch thick cold rolled steel. Other materials such as stiff plastics, and other similar materials known in the art can be utilized in the manufacture of the mounting tray. The strength of the material used for mounting tray 106 will depend on factors such as the size and weight of the radio to be supported, and the mounting environment that the mounting tray assembly will experience (i.e. inside a motor vehicle).

The housing of radio 130 preferably includes a movable handle unit 134 which can be locked via a standard key lock mechanism. At the rear of radio 130 is found heat sink area 136, which helps dissipate the heat generated by the high power transmitter (not shown) located inside of radio 130. Heat sink area 136 includes tapered fins 132 and rear surface 138.

In FIG. 2 a rear view of a radio 130 engaged in a mounting tray in accordance with the present invention is shown. The radio 130 is shown resting on top of the substantially planar surface 112 and supported by the upstanding side supports 102. The pair of cantilevered members 140 support the rear 138 of radio 130. Also shown are tapered fins 132 which are part of the radio heat sink area 136.

FIG. 3 illustrates a partial bottom view of the front of the mounting tray and radio in accordance with the present invention. As viewed from the bottom side, radio 130 includes a movable handle unit 134 which includes a set of protruding latching members 310 and 304. Each of the protruding latching members 310 and 304 includes a raised lip surface 308 which helps the latching members 310 and 304 engage with apertures 124 and 110, respectively. When handle 134 is moved up towards the radio, the latching members 310 and 304 engage their respective raised lip surfaces 308 with the apertures 110 and 124. The raised lip surfaces 308 preferably are curved in order to hook into latching members 310 and 304. Handle unit 134 provides a moment arm to preload cantilever members 140 and the front cantilevered section of the upstanding side rails 102 when radio 130 is slid into the mounting tray and locked in place. Preferably, handle unit 134 is spring loaded in order to provide automatic dismounting when the key lock mechanism is unlocked. When the key lock is unlocked the spring loaded handle 134 causes handle unit 134 to pull downward and cause raised lip surface 308 of latching member 310 to push against upturned latching bracket 108 which causes radio 130 to be pulled forward. Mounting tray 106 includes a set of protruding tabs 118 which are part of front raised portions which are part of the mounting tray's latching means. When radio 130 is united to the mounting tray, protruding tabs 118 engage into raised cavity areas 302 which are part of radio 130. The engagement of tabs 118 into slotted areas 302 helps retain the front of radio 130. When radio handle unit 134 is unlocked, radio 130 is pulled forward just enough to clear the protruding tabs 118 from the raised cavity areas 302, thereby allowing a person to lift radio 130 from the mounting tray.

A set of opposed side tabs 306 are also part of radio 130, and help mechanically load 130 against upstanding side rails 102 when the radio is slid into mounting tray 106. The housing of radio 130 is preferably made from a single piece of cast iron or other similar material having tabs 306 as part of the mold. Preferably, side tabs 306 are designed in such a way as to force the front section of side supports 102 to bend outwardly slightly, thereby mechanically loading front cantilevered portion of side rails 102. Tabs 306 mechanically load the front section of side rails 102 at the section where they are cantilevered 128 and not connected to planar surface 112.

Figure 4:
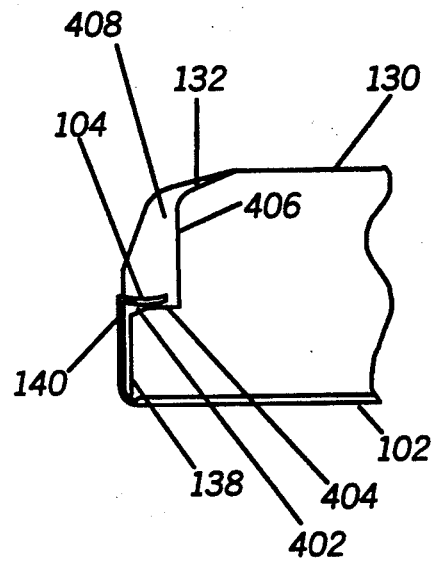
FIG. 4 is a partial sectional view of the radio assembly shown in FIG. 2 along section line 4—4.

FIG. 4 shows a partial sectional view of the radio assembly of FIG. 2 along section line 4—4. Cantilevered member 140 is engaged with cantilever engagement location 408 which is located at the rear 138 of radio 130. The cantilever engagement location 408 is formed by cutting away a portion of the heat sink area which is part of radio 130. Top support member 104 becomes mechanically loaded when radio 130 is slid into the mounting tray thereby helping to retain radio 130. Cantilever engagement location 408 consists of support ledge 404 which has a chamfered leading edge 402 that helps radio 130 slide under bowed support member 104. Also part of engagement location 408 is rear edge 406 which is approximately 0.45 inches inside of rear edge 138.

Figure 5:
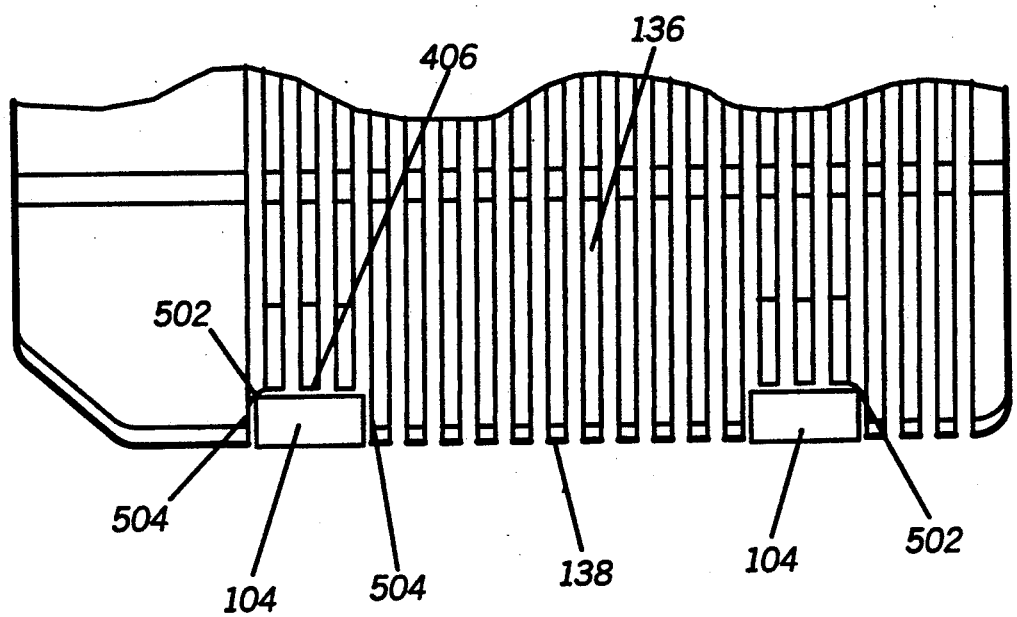
FIG. 5 is a partial top rear view of the radio and mounting tray combination in accordance with the present invention.

In FIG. 5 a partial top view of the radio engaged in the mounting tray is shown. Heat sink area 136 which is at the rear of radio 130 is shown having two engagement locations 408. The side walls 504 of the engagement location are approximately 1.5 inches apart allowing for support member 104 which has a width of approximately 1.25 inches to fit between side walls 504. Each of the side walls 504 preferably have rounded outer corners 502 which allow the for the alignment of the rear 138 of radio 130 when the radio is slid into the mounting tray. Rounded outer corners 502 press against the edges of top supports 104 when radio 130 is locked into mounting tray 106 and helps retain the radio by rearward loading the set of cantilever members 140 in the rear margin of the tray. e As has been shown, the present invention provides for a mounting tray 106 and radio assembly which secures a radio in all three degrees of freedom both at the front and rear of radio 130, thereby preventing an increase in vibration and hum caused from having a loose fitting mounting tray. The present invention allows the radio assembly the capability of passing such industry standard tests as the EIA Viobration, Hum and Noise test, and the MIL 810E crash safety shock test, and yet allows the radio to be quickly disconnected by a single turn of a key. By designing the mounting tray from a single sheet of cold rolled steel which is bent and stamped into shape, lower cost and higher reliability is attained over the prior art mounting trays.

What is claimed is:

1. A mounting tray for securing an electronic device, the electronic device having cavity areas, the mounting tray comprising:

a substantially planar surface for supporting the electronic device, the substantially planar surface including front, rear and opposed side margins;

a pair of upstanding side supports one being located substantially at each of the side margins, each of the upstanding side supports including a first section which is directly attached to the substantially planar surface and a second section which is cantilevered with respect to the first section and is not directly attached to the substantially planar surface;

a rear support means including at least one cantilevered member secured to the substantially planar surface substantially at the rear margin; and a latching means including front raised portions secured to said substantially planar surface at the front margin, the front raised portions having protruding tabs which extend beyond the front margin for engaging the electronic device cavity areas, the latching means further including a latching member having at least one aperture and an upturned latching bracket.

2. The electronic device mounting tray as defined in claim 1, wherein the substantially planar surface includes a plurality of vents and a plurality of recessed fastening locations.

3. The electronic mounting tray of claim 2, wherein the electronic device mounting tray is formed from a single piece of material.

4. The electronic mounting tray of claim 1, the at least one cantilevered member has a top support member which is bowed downward.

5. The mounting tray of claim 1, wherein the mounting tray is formed from a single sheet of cold rolled steel.

6. A radio assembly comprising:

a radio housing including a latching mechanism having a movable handle unit that has at least one protruding latching member, the latching mechanism further including a plurality of raised members and also including a set of opposed side tab members, the radio housing further including at least one cantilever engagement location; and a mounting tray including:

a substantially planar surface for supporting the radio housing, the substantially planar surface including front, rear and opposed side margins;

a pair of upstanding side supports one being located substantially at each of the side margins, each of the upstanding side supports including a first section which is directly attached to the planar surface and a second section which is not directly attached to the substantially planar surface for allowing the second section to be cantilevered with respect to the first section, the second sections mate with the radio housing and are mechanically loaded by the set of opposed side tab members located on the radio housing;

a rear support means including at least one cantilevered member secured to the substantially planar surface substantially at the rear margin for engaging with the at least one cantilever engagement location found on the radio housing; and a latching means including front raised portions secured to the substantially planar surface at the front margin, the front raised portions having protruding tabs that engage the radio housing, the latching means further including a latching member having at least one aperture and an upturned latching bracket, the at least one aperture engaging with the at least one protruding latching member of said radio housing.

7. The radio assembly of claim 6, wherein the movable handle unit further includes a key lock mechanism.

8. The radio assembly of claim 6 wherein the mounting tray is formed from a single piece of metal.

9. The radio assembly of claim 8, wherein the at least one cantilever support location further includes a chamfered ledge and a substantially rounded outer wall.

10. The radio assembly of claim 9, wherein the at least one cantilevered member has a top support member having a downward bend that mechanically loads the cantilever engagement location when the radio housing is engaged to the mounting tray. t

* * * * *